(12) United States Patent
Kulik et al.

(10) Patent No.: US 12,458,785 B2
(45) Date of Patent: Nov. 4, 2025

(54) DEVICE AND METHOD FOR PRODUCING MICROSTRUCTURES

(71) Applicant: LTS Lohmann Therapie-Systeme AG, Andernach (DE)

(72) Inventors: Michael Kulik, Mühlheim-Kärlich (DE); Thorsten Fehr, Andernach (DE); Stefan Erlhofer, Kempenich (DE); Sebastian Scherr, Neuhäusel (DE); Sebastian Dommasch, Mühlheim-Kärlich (DE)

(73) Assignee: LTS Lohmann Therapie-Systeme AG, Andernach (DE)

( * ) Notice: Subject to any disclaimer, the term of this patent is extended or adjusted under 35 U.S.C. 154(b) by 1276 days.

(21) Appl. No.: 17/274,521

(22) PCT Filed: Sep. 4, 2019

(86) PCT No.: PCT/EP2019/073554
§ 371 (c)(1),
(2) Date: Mar. 9, 2021

(87) PCT Pub. No.: WO2020/053043
PCT Pub. Date: Mar. 19, 2020

(65) Prior Publication Data
US 2022/0032026 A1 Feb. 3, 2022

(30) Foreign Application Priority Data
Sep. 10, 2018 (DE) ...................... 10 2018 215 324.8

(51) Int. Cl.
*A61M 37/00* (2006.01)
*B29C 39/42* (2006.01)
(Continued)

(52) U.S. Cl.
CPC . *A61M 37/0015* (2013.01); *A61M 2037/0053* (2013.01); *B29C 39/42* (2013.01);
(Continued)

(58) Field of Classification Search
CPC ...... A61M 37/0015; A61M 2037/0053; B29C 39/42; B29C 2045/0094; B29C 2045/1745
See application file for complete search history.

(56) References Cited

U.S. PATENT DOCUMENTS 3,208,750 A * 9/1965 Firth ...................... B29C 39/006
264/328.2
9,968,766 B2 5/2018 Wakamatsu et al.
(Continued)

FOREIGN PATENT DOCUMENTS

CN 102202723 A 9/2011
CN 105643839 A * 6/2016 ........ A61M 37/0015
(Continued)

OTHER PUBLICATIONS

Yang et al., A scalable fabrication process of polymer microneedles, Int J Nanomedicine, 2012, pp. 1415-1422, vol. 7, doi: 10.2147/IJN. S28511. Epub Mar. 12, 2012. PMID: 22457598; PMCID: PMC3310406.

*Primary Examiner* — Ryan J. Walters
(74) *Attorney, Agent, or Firm* — The Webb Law Firm

(57) ABSTRACT

A device for manufacturing microstructures including a permeable template, wherein the template comprises at least one recess for manufacturing the microstructures. In addition, the device comprises a vacuum-generating device connected to the template such that a vacuum is applied to at least one side of the template. Further, a method for filling a permeable template, wherein the template comprises at least one recess for manufacturing microstructures. The method comprises feeding the at least one substance to be
(Continued)

filled in to the template as well as generating a vacuum on at least one side of the template

19 Claims, 3 Drawing Sheets

(51) Int. Cl.
*B29C 45/00* (2006.01)
*B29C 45/17* (2006.01)

(52) U.S. Cl.
CPC ............... *B29C 2045/0094* (2013.01); *B29C 2045/1745* (2013.01)

(56) References Cited

U.S. PATENT DOCUMENTS

| | | | |
|---|---|---|---|
| 10,441,532 | B2 | 10/2019 | Wakamatsu |
| 10,814,118 | B2 | 10/2020 | Wakamatsu |
| 11,504,512 | B2 * | 11/2022 | Lim ............... B29C 39/026 |
| 2011/0192562 | A1 | 8/2011 | Motoi et al. |
| 2013/0292886 | A1 | 11/2013 | Sagi et al. |
| 2016/0374939 | A1 | 12/2016 | Shastry et al. |
| 2017/0050010 | A1 * | 2/2017 | Mcallister ......... A61M 37/0015 |
| 2017/0189660 | A1 | 7/2017 | Baek |
| 2017/0361081 | A1 * | 12/2017 | Wakamatsu ............ B29C 41/02 |
| 2019/0351204 | A1 | 11/2019 | Sakazaki et al. |
| 2020/0197679 | A1 | 6/2020 | Li et al. |

FOREIGN PATENT DOCUMENTS

| | | | |
|---|---|---|---|
| CN | 106456953 A | 2/2017 | |
| CN | 110496304 A | 11/2019 | |
| DE | 4418314 C1 * | 1/1996 | ............... F04B 53/06 |
| EP | 3266494 A1 | 1/2018 | |
| EP | 3248593 B1 | 2/2019 | |
| EP | 3569281 A1 | 11/2019 | |
| JP | 2000233416 A | 8/2000 | |
| JP | 2013162982 A | 8/2013 | |
| JP | 2017517295 A | 6/2017 | |
| WO | 2010040271 A1 | 4/2010 | |
| WO | 2017107417 A1 | 6/2017 | |
| WO | 2018213605 A1 | 11/2018 | |

* cited by examiner

DEVICE AND METHOD FOR PRODUCING MICROSTRUCTURES

CROSS-REFERENCE TO RELATED APPLICATIONS

This application is the United States national phase of International Application No. PCT/EP2019/073554 filed Sep. 4, 2019, and claims priority to German Patent Application No. 10 2018 215 324.8 filed Sep. 10, 2018, the disclosures of which are hereby incorporated by reference in their entirety.

BACKGROUND OF THE INVENTION

The invention relates to an apparatus for manufacturing microstructures, in particular microneedles. In addition, the invention relates to a handling unit, preferably a cylindrical handling unit for manufacturing microstructures, in particular microneedles, having such an apparatus for manufacturing microstructures. Further, the invention relates to a method for filling a permeable, in particular gas-transmissible template. Finally, the invention relates to a method for manufacturing microstructures, in particular microneedles, comprising the method steps for filling a permeable template.

The microstructures to be manufactured are preferably microneedles which are in particular arranged in a microneedle array. Microneedles are used for directly administering active agents into the skin, which is also referred to as transdermal administration. For this purpose, the microneedles comprise just such a length that they merely penetrate the outer dermal layers but preferably do not reach nerves and blood vessels and thus do not damage them. Nevertheless, microneedles produce small holes in the upper dermal layers, whereby the intake of the active agents is significantly increased as compared to a purely external application of active agents.

Microneedle arrays comprising a plurality of microneedles which are attached to a carrier surface, for example, can be used for a short-term administration or a long-term application. A preferred mode of administering active agents from the microneedles into the skin is that the portions of the microneedles containing the active agents or the entire microneedle dissolve or are released and are thus taken in by the body via the skin. For this purpose, the microneedles are in particular at least partly manufactured from water-soluble substances or materials. Besides the direct administration of active agents through the microneedles it is also possible that the microneedles have pores or cavities or are configured as hollow needles for enabling the active agents to be administered to the skin in this manner. In addition, microneedles can per se be free be of active agents. Here, the active agent can be externally applied to the outside of the microneedles or an active-agent-containing substance can be applied to the places concerned on the skin after the microneedles have been removed from the skin for administering such active agents by means of microneedles, for example.

Microneedles can, inter alia, be made from ceramic material, metal or polymer. It is preferred that one or more active agent components are added to these materials which results in a formulation of the microneedles.

Prior art methods for manufacturing therapeutic or diagnostic microneedles or microneedle arrays are not suitable or suitable only to limited extent for a manufacture in an adequate quality and/or number.

A common method for manufacturing microneedles is casting the microneedles or entire microneedle arrays with the aid of casting molds made of silicone, for example. In particular due to the hydrophobic characteristics between the casting mold and the mostly liquid formulation fed thereon numerous problems arise in such manufacturing methods. On the one hand, the formulation to be fed does not enter or not completely enter the template of the casting mold and thus does not completely fill it. In addition, air inclusions occur in the formulation to be cast and/or air inclusion occur between the formulation and the template in the casting mold. This results in defective microneedles, for example, which can lead to medical errors due to the incorrectly metered administration.

It is an object of the invention to provide a device for manufacturing microstructures, a handling unit for manufacturing microstructures, a method for filling a permeable template and a method for manufacturing microstructures, wherein the manufacture of microstructures is improved.

SUMMARY OF THE INVENTION

According to the invention, the object is achieved with the features of claims 1, 14, 15 and 19.

The device for manufacturing microstructures according to the invention is in particular a device for manufacturing microneedles, wherein the microneedles are preferably configured as microneedle arrays. According to a preferred embodiment, the device is a casting device such that the microstructures can essentially be manufactured by casting. The materials of the microstructures to be manufactured and thus the casting material to be used are preferably a ceramic material and/or metal as well as particularly preferably polymer, such as PVP or PLA, for example. Other materials, too, such as e.g. sugar, can be used. Particularly preferably, the microstructures to be manufactured are active-agent-containing needles which are at least partially soluble, preferably water-soluble. The manufacture of soluble polymer microneedles or soluble polymer microneedle arrays is preferred, for example. Accordingly, the device is in particular configured for the manufacture of the microstructures above. The device comprises at least one permeable template. Here, permeable means in particular a gas permeability or a gas transmissibility. On the other hand, the template is in particular liquid-impermeable. In particular, the term gas-transmissible or air-transmissible can be used instead of permeable. Accordingly, a liquid casting material fed onto the template cannot pass through the template, for example, but gases, such as air inclusions, for example, can pass through the template. The permeability can also be realized by holes, in particular microholes in the template. The template is the master mold, i.e. the negative of the outer shape of the microstructure to be manufactured. The template comprises at least one recess for manufacturing the microstructures. The at least one recess is thus a kind of opening into which the casting material can be filled, for example. It is particularly preferred that the recesses are of an essentially conical configuration such that a microstructure to be manufactured therein has in particular a pointed conical shape. In particular, the base area of the conical recess extends from the base area of the template in a tapered form. Instead of or besides the conical shape in particular a pyramidal shape is also possible. Thus it is also possible that in a template having several recesses pyramidal and/or conical recesses exist. It is preferred that the template comprises a plurality of preferably similar recesses such that, when the casting material is fed, a microarray is produced, for example. The template can also comprise raised portions, wherein the recesses, according to definition, are then located next to the raised portions. In other words, the template can have a kind of structure similar to a plurality of mountains and/or valleys or craters. Further, the device comprises a vacuum-generating device connected to the template. This connection of the vacuum-generating device to the template is configured such that a vacuum is applied in particularly directly to at least one side of the template. It is particularly preferred that the vacuum-generating device is connected to the template such that at least opposite the at least one recess of the template a vacuum is applied. It is preferred that the vacuum is applied to the rear side of the template, i.e. the side not serving for receiving the casting material. Here, such a vacuum does in particular not mean that the entire template is located inside a vacuum chamber, such as a vacuum furnace, for example, but preferably means a direct, in particular selective negative pressure generation directly on the at least one corresponding side of the template. For example, this can be realized in that a chamber or a chamber-like device, such as a tube, for example, abuts on the corresponding at least one side of the template in a tight manner towards the surroundings, wherein a negative pressure prevails in this chamber. According to the definition used here, the vacuum need not be a complete vacuum but a lower pressure than the ambient pressure suffices. Consequently, the vacuum describes a negative pressure. In other words, the vacuum describes a negative pressure difference between the area where the vacuum is applied and the surrounding area. If, for example, atmospheric pressure (of the earth) prevails in the surroundings, the vacuum is a lower pressure than atmospheric pressure. Preferably, a difference of at least $\Delta$ 0.8 bar, particularly preferably at least $\Delta$ 0.9 bar exists between the vacuum pressure and the surroundings. For example, the vacuum is a pressure of less than 0.2 bar, particularly preferably less than 0.1 bar in the case of atmospheric pressure in the surroundings. It is preferred that the device for manufacturing microstructures and thus in particular all external components of the device have a cylindrical shape, in particular a circular cylindrical shape.

According to a preferred aspect, the device comprises a vacuum chamber connected to the template. Here, the vacuum chamber is in particular configured such that the vacuum chamber can, at least temporarily, by itself maintain a vacuum. Here, it is preferred that the vacuum in the vacuum chamber is or was generated by an external device, such as a vacuum pump, for example. Preferably, the connection to this external device, such as vacuum pump, for example, was interrupted or disconnected. Despite the disconnection of the connection between the external device and the vacuum chamber it is preferred that the vacuum generated in the vacuum chamber is at least essentially maintained. It is however possible that, when the vacuum is maintained, a small, in particular continuous decrease of the vacuum occurs due to air intake by the template and/or due to leaks etc., for example. It is preferred that the interruption of the connection between the vacuum chamber and the external device is realized by uncoupling the vacuum chamber from the external device. In particular, the vacuum chamber is directly connected to at least one, preferably merely one side of the template. This side is preferably the side of the template opposite the recesses. The connection between the vacuum chamber and the template is in particular tight towards the surroundings, such that sealing of the connecting point between the vacuum chamber and the template is realized such that in particular a gas imperme-ability between the connection and the surroundings exists. For example, the template can be connected to the vacuum chamber by means of ultrasonic welding or gluing. It is further possible that the template and the vacuum chamber are formed as a single piece, which is also referred to as integrally formed. Here, the integral configuration can be realized such that a polymer vacuum chamber having an abutting silicone template is manufactured by multi-component injection molding, for example. It is preferred that the vacuum chamber is closed. For example, it is also possible that the template and the vacuum chamber are integrally formed and/or made from the same material. In such an integral configuration and/or a configuration of the same material it is preferred that the vacuum chamber is configured such it that can withstand a pressure difference between the interior of the vacuum chamber and the surroundings of at least $\Delta$ 3 bar, in particular at least $\Delta$ 4 bar without collapsing. For example, such a stable configuration of the vacuum chamber can be realized by means of a reinforcing structure in the wall of the vacuum chamber, e.g. a metal structure. A reinforcing structure is possible in any configuration of the vacuum chamber, i.e. even when the vacuum chamber and the template are not integrally formed and/or made from the same material, for example. Preferably, the vacuum chamber is configured as a hollow cylinder, in particular as a hollow circular cylinder. It is preferred that the vacuum chamber comprises a bottom on the side opposite the side where the template is arranged, which bottom in particular at least partially closes the vacuum chamber. If the vacuum chamber is a hollow cylinder, for example, the bottom gives the vacuum chamber a kind of a pot shape. It is preferred that the template is connected to the vacuum chamber such that the template is easily accessible from all sides. Accordingly, it is particularly preferred that the template is connected to the vacuum chamber at one end preferably opposite the bottom of the vacuum chamber having the pot shape.

According to a preferred embodiment, the vacuum chamber comprises at least one vacuum chamber opening, such as a bore, for example. This opening is preferably arranged opposite the template, particularly preferably in the bottom of the vacuum chamber. It is preferred that via this opening the vacuum chamber can be connected or is connected to a vacuum-generating device, such as a pump, for example, such that inside the vacuum chamber a vacuum can be generated.

It is preferred that the device comprises an in particular selective coupling device for a connection between the vacuum-generating device and the template. Preferably, the coupling device is arranged in the area of the vacuum chamber opening. It is thus preferably possible to couple a pump to the vacuum chamber opening (coupling) and thus generate a vacuum. Subsequently, it is preferably possible to perform uncoupling (decoupling) between the pump and the vacuum chamber opening. When a vacuum chamber maintaining the vacuum by itself is provided, it is preferred that the vacuum in the vacuum chamber is maintained after uncoupling. The coupling or uncoupling between the vacuum chamber opening and the vacuum-generating device is preferably performed via connecting or disconnecting a gas-bearing connecting device, such as a tube or a hose or a connection, for example, starting at the vacuum-generating device and extending to the template, in particular to the vacuum chamber opening. Alternatively, it is also possible that the gas-bearing connecting device starts at the template, in particular the vacuum chamber opening, and can be connected to or disconnected from the vacuum-generating device. The coupling device can comprise a threaded connecting device, a plug connection, a quick-acting coupling or a connecting flange device, for example. For instance, it is also possible that the coupling device is an advance-type or a suction-type coupling device. For example, it is thus possible that the vacuum-generating device establishes a releasable connection to the template, preferably to the vacuum chamber, particularly preferably to the opening of the vacuum chamber via a kind of suction cup or the like, which allows for a connection between the vacuum-generating device and the vacuum chamber sealed towards the surroundings. The coupling device is preferably arranged between the template or the vacuum chamber and the vacuum-generating device such that the elements are adapted to be coupled to each other. It is preferred that a portion of the coupling device is connected to, in particular integrally formed with the template or the vacuum chamber and/or another portion of the coupling device is connected to, in particular integrally formed with the vacuum-generating device.

In particular, the device comprises at least one valve for preferably selectively closing the at least one vacuum chamber opening. According to a preferred embodiment, the valve is configured as a self-closing valve. Thus the valve closes the vacuum chamber in the initial state when the valve is not operated, for example. The valve is preferably configured such that it maintains an existing pressure ratio in the vacuum chamber. The valve is in particular configured as a shut-off valve such it selectively blocks a volumetric flow or allows it to pass through.

The valve of the device is preferably an elastic closure, in particular an elastic plug. It is preferred that the closure comprises a plastic material, in particular elastomer, such as silicone, for example, or is essentially made from this material. The closure is preferably configured such that it returns into its initial closing position after having been folded back and/or displaced and/or compressed. It is particularly preferred that the closure is self-sealing after having been pierced, thus closing the pierced opening. If the closure is pierced by a hollow needle, for example, for thus generating a negative pressure by the extraction of air, for example, the closure closes the chamber again when the hollow needle has been removed. Accordingly, it is possible that a generated vacuum is maintained in the chamber, wherein the chamber is preferably merely a cavity and thus comprises no vacuum-generating devices, such as vacuum pumps, for example. Besides the configuration of the valve as an elastic closure, it is also possible that the valve is configured as a check valve. Here, such a configuration is preferred where a volumetric flow from the interior of the chamber to the surroundings is possible, but in the reverse direction such a flow is prevented due to the function of the check valve. Accordingly, it is possible to apply a negative pressure to the valve of the vacuum chamber, wherein a volumetric flow escapes from the chamber via the check valve and thus a negative pressure is produced in the chamber. In particular, the valve and/or the hollow needle thus correspond to the coupling device or form part of the coupling device. It is possible that the chamber comprises a venting means in connection to the at least one valve, for example, such that the chamber can return from a vacuum to an ambient pressure with the aid of the venting device.

According to a preferred embodiment, the device comprises a mold connected to the template. The mold which is preferably configured as a casting mold is in particular integrally formed with the template. Thus the template forms part of the mold. Besides the template, the mold can comprise further elements. For example, it is thus possible that the mold has the shape of a feed opening or the like for receiving the casting material. In particular, the mold is a lost-wax mold, also referred to as a disposable mold. The mold is preferably of a cylindrical configuration and particularly preferably configured as a hollow cylinder, wherein in the case of the hollow cylindrical mold the template forms a kind of bottom inside hollow cylindrical mold. At one of the ends, in particular the base area, of the hollow cylindrical mold this bottom can be provided or it can be located therebetween. The template can in particular be connected to the hollow cylindrical mold such that the template forms a kind of cover. If the template is at least partly arranged inside the hollow cylindrical mold the projecting portion of the hollow cylindrical mold can form a feed opening. Here, it is also possible that the feed opening receives a portion of the casting material and thus the cast microstructure, in particular the microneedle array comprises a cylindrical, for example a kind of circular end portion. For example, thus the microneedles can be cast simultaneously with an integrally formed carrier surface.

It is preferred that the mold comprises a flange for connecting to the vacuum chamber. The flange is in particular located at the end of the mold opposite the template. In particular, the flange radially extends starting at the mold.

According to a preferred embodiment, the template and/or the mold include a plastic material, preferably elastomer and particularly preferably silicone. In particular, the template and/or the mold are made from such a material. Preferably, a silicone is used which is inherently permeable, in particular gas-transmissible such that the permeability of the template is ensured. It is further possible that the template and/or the mold include metal and are preferably made therefrom. For example, in the embodiment made from metal it is possible that the template comprises holes, preferably microholes for allowing for such a permeability of the template.

It is preferred that the vacuum chamber comprises a flange and/or a thread. If the vacuum chamber comprises a flange the latter is configured for connecting to the mold, preferably the flange of the mold. If the vacuum chamber comprises a thread it is preferred that the latter is also configured for connecting to the mold. However, here it is possible that the mold is adapted to be directly or indirectly screwed to the vacuum chamber. In the case of an indirect connection an additional screw element, such as a nut or the like, can be provided, for example. Instead of or in addition to the thread other connecting devices, such as devices for a plug connection or a clip connection or clamps etc., can be contemplated.

According to a preferred embodiment, the device comprises a connecting element. The connecting element preferably serves for connecting the mold and the vacuum chamber, wherein a screw connection is preferred. Thus the connecting element in particular comprises a thread. Here, the connection between the mold and the vacuum chamber is in particular configured such that a sealing connection is realized. Instead of the screw connection another form-locking and/or bonded and/or force-locking connection is possible. For instance, a welded connection and/or a soldered connection and/or a glued connection and/or a clip connection are possible.

According to a preferred embodiment, the connecting element comprises a kind of cap nut. Here, the cap nut is in particular configured such that it is adapted to be placed over the mold or acts as a cap of the latter and can be screwed to the vacuum chamber, for example. For instance, in the case of a mold having a flange the cap nut can be placed over the mold, wherein an edge of the cap nut abuts on the flange. For example, a projecting thread of the cap nut can then be screwed to a thread of the vacuum chamber, and thus a connection between the mold and the vacuum chamber can be created.

For example, the connection between the mold and the vacuum chamber can also be configured as a direct connection between the mold and the vacuum chamber. Accordingly, it is possible that the connection between the mold and the vacuum chamber is a form-locking and/or a bonded and/or a force-bonding connection. For instance, this is a welded connection and/or a soldered connection and/or a glued connection and or a screwed connection and/or a clip connection.

Preferably, the device comprises a support element for supporting the template. Here, the support element is in particular configured such that it protects the template from deformation caused by the vacuum applied to the template. It is preferred that the support element is gas-transmissible. For this purpose, the support element comprises a grid and/or ribs, for example. In particular, the support element can be of a cylindrical configuration, wherein a supporting and gas-transmissible structure is located on the cylinder base area. It is preferred that the support element is adapted to planarly abut on the template.

Connections between components of the device are preferably of a sealing configuration, wherein it is preferred that all connections are of a sealing configuration such that the interior of the device is sealed towards the surroundings in a particularly gas-tight manner, particularly preferably a hermetical manner. For instance, the connection between the mold and the vacuum chamber, with or without a connecting element, is preferably configured such that a biasing force exists which produces a sealing connection. Alternatively or additionally, sealing elements, preferably sealing rings can be provided between the components, in particular between the mold and the vacuum chamber. Due to the vacuum in the vacuum chamber it is possible in an advantageous manner that the sealing function is caused or enhanced since the components thereby experience a kind of self-centering and thus a tighter connection is realized.

The handling unit for manufacturing microstructures, in particular microneedles, is in particular a cylindrical handling unit, particularly preferably a circular cylindrical handling unit. The handling unit comprises a device for manufacturing microstructures having at least one of the features described above. The handling unit serves as a kind of carrier element for the microstructure to be manufactured, wherein it preferably serves as a carrier element during the entire manufacturing process. Thus the handling unit can be used for the casting process of the microstructures on the one hand but additionally serve for transport steps and/or additional working steps such as curing and/or post processing and/or storing etc. Accordingly, the handling unit is preferably configured such that, after the casting process, it can be further transported on conveyor belts and/or manually, for example. It preferred that the handling unit is a disposable handling unit, also referred to as a lost-wax handling unit or lost-wax casting handling unit.

The method according to the invention for filling a permeable template is in particular a method for filling a gas-transmissible template. The template comprises at least one recess for manufacturing microstructures. One method step is placing a substance to be filled in onto the template. The substance is in particular a formulation of the casting material having at least one active agent. Here, in particular polymer is used as the casting material. The at least one substance can be fed such that one component after the other or a mixture thereof is fed. When one components after the other is fed it is possible on the one hand that the mixture is fed in batches or various formulation ingredients are fed in batches. Further, the method step includes the generation of a vacuum on at least one side of the template. In particular, the vacuum is generated opposite the at least one recess. The method step of generating the vacuum can be performed before and/or after and/or during the step of feeding the substance to the template. It is also possible that the generation of the vacuum is performed between the various feeding phases. The vacuum allows for gas inclusions, in particular air inclusions between the substance and the template to be extracted and thus allows for a complete filling of the template with the substance to be fed.

According to a preferred embodiment of the method, evacuation of a vacuum chamber connected to the template is performed via a connection to the interior of the vacuum chamber such that the vacuum is generated. Alternatively or additionally to the evacuation, a step of filling the vacuum chamber via a connection to the interior of the vacuum chamber for generating an atmospheric pressure or a positive pressure can be performed. By means of evacuation the vacuum can be generated for thus extracting gas inclusions from the template. By means of generation of the atmospheric pressure or the positive pressure it is possible, preferably following the feeding of the substance, after the curing of the microstructure, for example, to easily release or remove the microstructure from the template.

In particular, the vacuum is generated by means of a preferably selective coupling of a vacuum-generating device to the template, preferably to the vacuum chamber, particularly preferably to a vacuum chamber opening of the vacuum chamber. Here, it is preferred that the vacuum-generating device is coupled prior to the generation of the vacuum. In particular, after the coupling and/or after the generation of the vacuum the vacuum-generating device is uncoupled.

Preferably, the connection to the interior of the vacuum chamber is created by penetrating, in particular piercing a valve of the vacuum chamber. The valve is in particular an elastic valve, wherein the valve is particularly preferably an elastic plug. The valve is preferably pierced by a hollow needle or a cannula. For example, when the valve is pierced by the hollow needle, gas, in particular air, can be extracted from the vacuum chamber through the hollow needle and thus a vacuum can be created. It is preferred that the valve is of a self-closing configuration. Thus it is possible that after removal of the hollow needle a self-closing or self-sealing of the piercing site occurs. Thus a vacuum generated in the vacuum chamber can be maintained by the chamber itself.

It is preferred that the method for filling a permeable template, after the step of feeding the substance and before a removal from the mold, comprises another step of molding. Here, in particular the substance in the template, preferably the curing material, is pressurized. According to a preferred embodiment, this pressurization is performed on the side of the substance opposite the template. For pressurization, a pressure stamp can be used, for example. For this purpose, it is preferred that the pressure stamp is pressed onto the substance in the template. It is also conceivable that in the surroundings of the substance, i.e. preferably in the area where no vacuum is applied, particularly preferably in the surroundings of the device for manufacturing microstructures or the handling unit, a positive pressure is generated. This positive pressure is in particular a positive pressure difference between the area where this positive pressure prevails and the pressure in the area where the vacuum is applied to the template.

This pressure difference is in particular approximately Δ 3 bar, particularly preferably approximately Δ 4 bar. It is particularly preferred that in the surroundings of the device for manufacturing microstructures or the handling unit a pressure, in particular an air pressure of approximately Δ 3 bar, particularly preferably 4 bar is generated. Preferably, the positive pressure is generated in that the device for manufacturing microstructures or the handling unit is placed into a positive-pressure chamber.

Following the feeding of the substance to the template, a step of removing the structure to be manufactured with the aid of the template from the mold, i.e. releasing the structure from the template, is preferably performed. This step can comprise the generation of the atmospheric pressure or the positive pressure in the vacuum chamber as describe above, for example. The generation of the atmospheric pressure or the positive pressure in the vacuum chamber can thus be a sub-step of the step of removal from the mold or constitute the entire step of removal from the mold. The step of removal from the mold preferably comprises an in particular manual or mechanical removal of the structure from the template. The removal of the structure from the template is preferably performed by a vacuum gripper. Dropping or pressing the structure out of the template by generating the atmospheric pressure or the positive pressure in the vacuum chamber, for example, is also possible. Further, it is possible that the structure is removed from the template in that an adhesive layer, such as an adhesive tape, for example, is placed onto the structure by means of a kind of lifting and/or moving arm, for example, and subsequently the lifting and/or moving arm removes and/or releases the structure connected to this lifting and/or moving arm via the adhesive layer from the template. Here, the adhesive layer can be adhesive on both sides such that the structure can subsequently be attached to a receiving device.

The method for manufacturing microstructures according to the invention is in particular a method for manufacturing microneedles. The method is preferably performed with the method features or method steps described above of the method for filling a permeable template. It is particularly preferred that in the execution of the method for manufacturing microstructures a device for manufacturing microstructures as described above or a handling unit as described above is used.

Accordingly, the method for filling a permeable template and/or the method for manufacturing microstructures can be supplemented by one or more described features of the device for manufacturing microstructures and/or the handling unit. Furthermore, the device for manufacturing microstructures and/or the handling unit are preferably configured for executing the method features of the method for filling a permeable template and/or the method for manufacturing microstructures.

The device for manufacturing microstructures and/or the handling unit can comprise one template, but also a plurality of templates. Furthermore, the method for filling a permeable template and/or the method for manufacturing microstructures can be executed using one template or a plurality of templates.

BRIEF DESCRIPTION OF THE DRAWING

Hereunder the invention will be described in detail on the basis of preferred embodiments with reference to the drawings in which.

In the Figures identical components or elements are denoted by the same reference numerals. In particular for the sake of clarity elements already identified are preferably not provided with reference numerals in all Figures.

DESCRIPTION OF THE INVENTION

Figure 1:
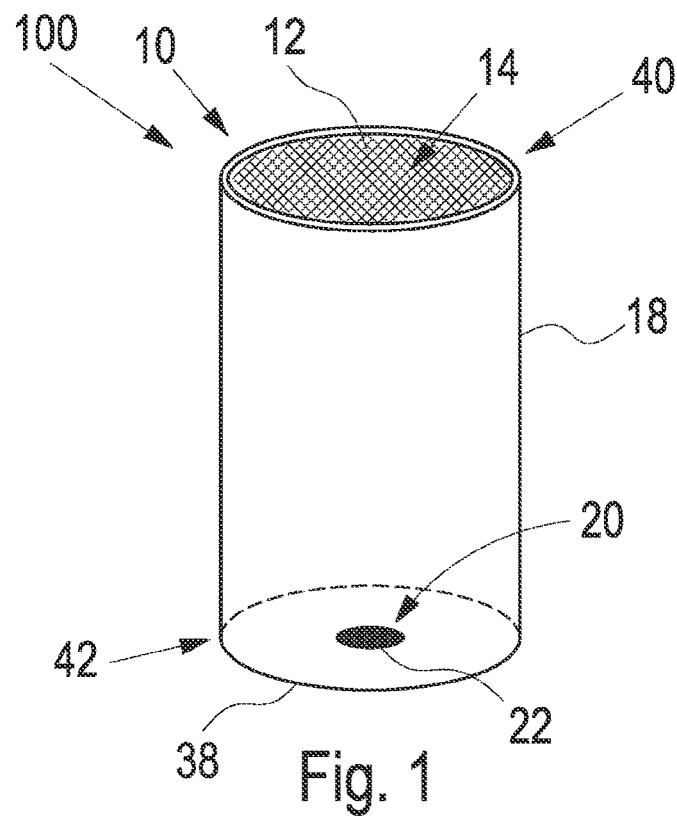
FIG. 1 shows a schematic perspective view of a preferred embodiment of a handling unit according to the invention having a device for manufacturing microstructures according to the invention.

FIG. 1 shows an embodiment of a handling unit 100 according to the invention and an embodiment of a device for manufacturing microstructures 10 according to the invention.

The device 10 comprises a circular cylindrical vacuum chamber 18. The vacuum chamber 18 has a hollow interior such that, with regard to the embodiment of the vacuum chamber 18, a hollow cylindrical shape is provided. At one end 40 the vacuum chamber 18 is connected to a template 12. Here, it is possible that the template 12 is integrally formed with the vacuum chamber. On the other hand, it is possible that the template 12 and the vacuum chamber 18 are two components which are connected to each other by gluing and/or ultrasonic welding, for example. A preferred embodiment of the template 12 and the vacuum chamber 18 is that they are jointly produced by multi-component injection molding. Here, it is thus possible that the vacuum chamber 18 is made from a polymer in particular adapted to maintain its shape and the template 12 is made from silicone. Accordingly, the template 12 is injected onto the vacuum chamber 18. The connection produced by injection can be reinforced in particular by ultrasonic welding.

The template 12 comprises a plurality of recesses 14, wherein, as illustrated, these are conical recesses 14 tapering downward. The template is permeable, i.e. transmissible, in particular gas-transmissible. If the template 12 is made from silicone, for example, a silicone material is preferred that is inherently gas-transmissible. Here, the template is the master mold for a microstructure, in particular a microneedle array. For example, when a casting formulation is fed to the template, the casting material flows into the recesses 14 and forms the microneedles in these recesses 14. When the casting material is fed in such a quantity that it projects beyond the recesses, it is possible to form the carrier surface for the microneedle array in a circular shape, for example.

On the other side 42 of the vacuum chamber 18 the vacuum chamber 18 comprises a bottom 38. This bottom is in particular integrally formed with the vacuum chamber 18 and made from the same material as the latter. The bottom 38 comprises a vacuum chamber opening 20 configured as a bore. This vacuum chamber opening 20 is closed by a valve 22. In the illustrated embodiment, the valve is an elastic layer preferably made from elastomer. Here, the elastic layer 22 is configured such that, when it is pierced by a hollow needle 36, for example, it allows for a connection to the interior 34 of the vacuum chamber via the hollow needle. When the hollow needle 36 is subsequently removed, the layer 22 closes itself and thus ensures a preferably hermetical sealing of the vacuum chamber 18 towards the surroundings. Thereby, an embodiment of a coupling device for connecting the template or the vacuum chamber to a device (not shown) for generating a vacuum, such as a pump, for example, is created.

As illustrated, the device 10 has a circular cylindrical shape.

Figure 2:
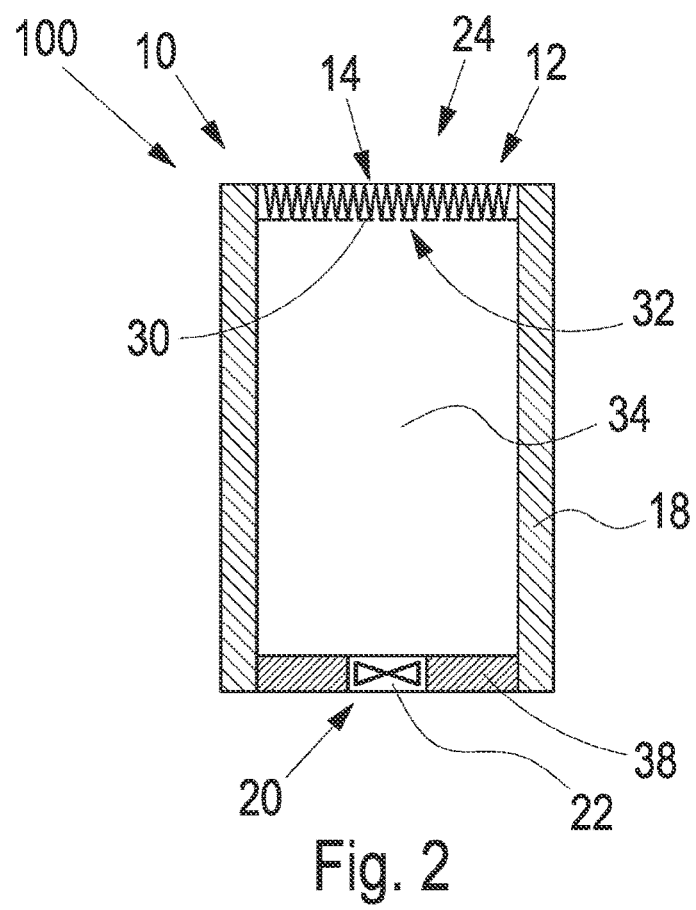
FIG. 2 shows a schematic sectional view of another preferred embodiment of a handling unit according to the invention having a device for manufacturing microstructures according to the invention.

FIG. 2 shows a similar embodiment as FIG. 1 of the handling unit 100 according to the invention having the device for manufacturing microstructures 10 according to the invention but as a schematic sectional view. Here, too, the device 10 comprises a cylindrical vacuum chamber 18 with a template 12 connected to one side and is closed on the other side by the bottom 38. In the illustrated embodiment, the valve 22, which is only schematically shown here, is a check valve 22. This check valve 22 allows a volumetric flow, in particular an air flow, to travel from the interior 34 of the vacuum chamber towards the surroundings of the vacuum chamber but blocks a volumetric flow in the other direction, i.e. from the surroundings to the interior 34 of the vacuum chamber.

As illustrated, the device 10 comprises a support element 30 below the template 12. This support element 30 is gas-transmissible and in particular configured as a kind of grid structure. In particular, the support element 30 planarly abuts on the rear side of the template 12. If the vacuum chamber 18 has a vacuum in its interior 34, said vacuum acts on the lower side 32 of the template 12. If the template is an elastic template 12 made from silicone, for example, the vacuum can cause an inward deformation of the template 12. This deformation can result in a defective master template for the microstructure to be manufactured, for example, and/or lead to failure, for example tearing, of the template 12 on the other hand. The abutting support element 30, which is preferably adapted to maintain its shape, prevents the template 12 from deforming. If the support structure is configured as a grid it is possible that the support element is configured in the form of ribs or a hole perforation plate. It is further possible that the support element which is configured as a reinforcing structure preferably made of metal wire, for example, is directly integrated at and/or in the template 12.

For example, if a vacuum pump not shown is connected to the vacuum chamber 18 via the valve 22, a vacuum can be generated in the interior 34 of the vacuum chamber 18. For instance, this can be realized by attaching a kind of suction cup to the illustrated lower side of the vacuum chamber 18, wherein the suction cup grips over the valve 22. If the suction cup generates a suction effect, the valve 22 in particular configured as a check valve opens and allows for a volumetric flow, in particular an air flow from the interior 34 of the vacuum chamber to the surroundings such that a vacuum is built up in the vacuum chamber 18.

Figure 3:
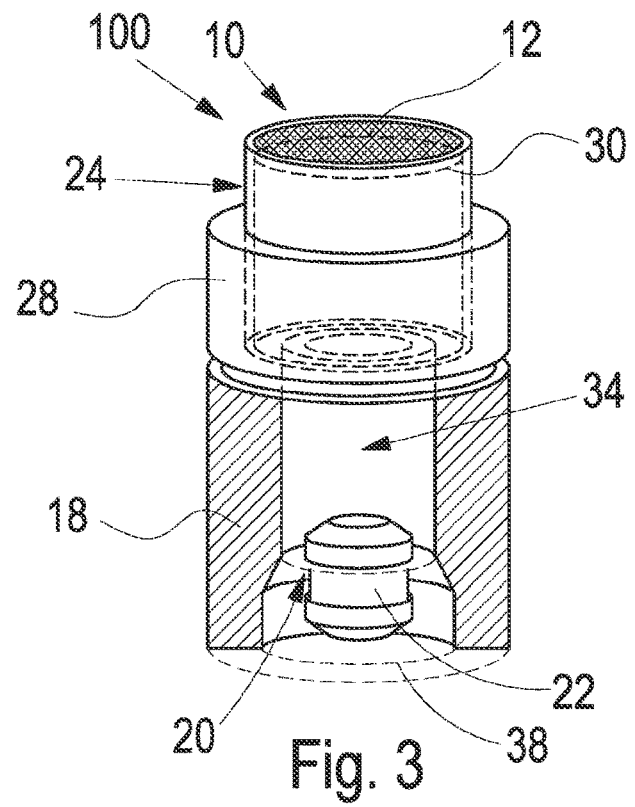
FIG. 3 shows a perspective view of another preferred embodiment of a handling unit according to the invention having a device for manufacturing microstructures according to the invention.
Figure 4:
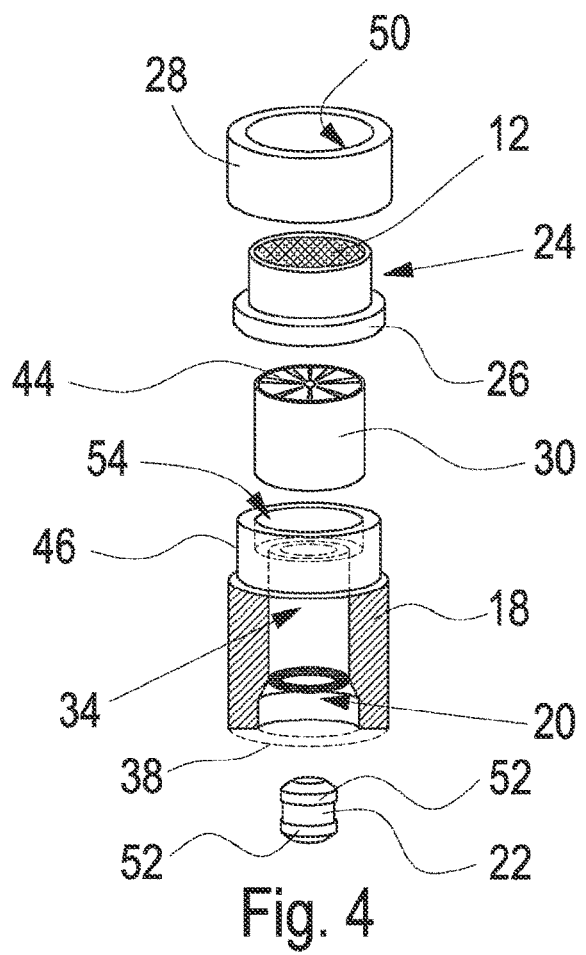
FIG. 4 shows an exploded view of the embodiment of a handling unit according to the invention having the device for manufacturing microstructures according to the invention of FIG. 3.

FIG. 3 shows a perspective view of another embodiment of a handling unit 100 according to the invention having a device 10 for manufacturing microstructures according to the invention. FIG. 4 shows a corresponding exploded view. The device 10 comprises a hollow cylindrical vacuum chamber 18 (shown here as a sectional view) having an interior 34. On the lower side, as illustrated, the vacuum chamber comprises a bottom 38 having a central bore 20. The bore 20 connects the surroundings of the vacuum chamber to the interior 34 of the vacuum chamber.

The bore 20 is closed by a valve 22. In the illustrated embodiment, the valve 22 is an in particular self-closing plug preferably made from an elastic material, such as elastomer, for example.

Inside a recess 54 of the vacuum chamber 18—wherein the recess 54 has a larger diameter than the interior 34 of the vacuum chamber—a hollow cylindrical support element is arranged which preferably abuts on the shoulder of the recess 54 as well as the interior wall of the recess 54 of the vacuum chamber 18. On the upper base area, as illustrated, the support element 30 comprises a support structure composed of a plurality of ribs 44.

A flange 26 of a mold 24 abuts in particular coaxially and with the same outer diameter on the front end, as illustrated, at the upper end of the vacuum chamber 18. This flange 26 radially extends outward starting from the cylindrical mold 24, wherein the latter is in particular a casting mold 24. The mold 24 is integrally formed with the flange 26. At the end opposite the flange 26 the mold 24 comprises a template 12. Here, the template 12 can be integrally formed with the mold 24 or it is possible that the template 12 and the mold 24 are two components. The integral configuration allows for the template 12 and the mold 24 to be jointly manufactured by injection molding and/or to be made from the same material, preferably silicone.

When the device 10 is assembled or mounted, the template 12 planarly abuts on the supporting structure of the supporting element 30 composed of ribs 44. Thus, the support element 30 and the support structure of the supporting element 30, respectively, protects the template 12 from an downward deformation, as illustrated.

For realizing an assembled embodiment, the device 10 comprises a connecting element 28. The connecting element which is also of a cylindrical configuration comprises an edge 48 extending radially inward at the upper end, as illustrated. The inner wall of the connecting element 28 comprises a thread 50. This thread 50 in particular configured as a female thread can be screwed to a thread 46 of the vacuum chamber 18 preferably configured as a male thread. In the case of such an assembly the connecting element 28, as a kind of cap nut, is placed over the mold 24 abutting on the front end of the vacuum chamber 18. Instead of the embodiment with the thread 50 at the connecting element 28 and the thread 46 at the vacuum chamber 18, a different connection between the connecting element 28 and the vacuum chamber 18 in the form of an interference fit connection, for example, is possible. The connection allows for a linked-up embodiment or assembly of the device 10, in particular the vacuum chamber 18 with the support element 30 arranged therein as well as the mold 24 arranged on the front end and the connecting element 28 placed over and screwed to the vacuum chamber in the form of a cap. The plug 22 is preferably connected to the bore 20 via a kind of interference fit or held in the bore 20 in this manner. In addition, the plug comprises two radial thickened portions 52 which, when the plug 22 is inserted, are deformed in particular due to an elastic material used such that the plug 22 fits into the bore 20. After the insertion the thickened portions 52 expand above and/or below the bore 20 such that, accordingly, the position is secured.

Figure 5:
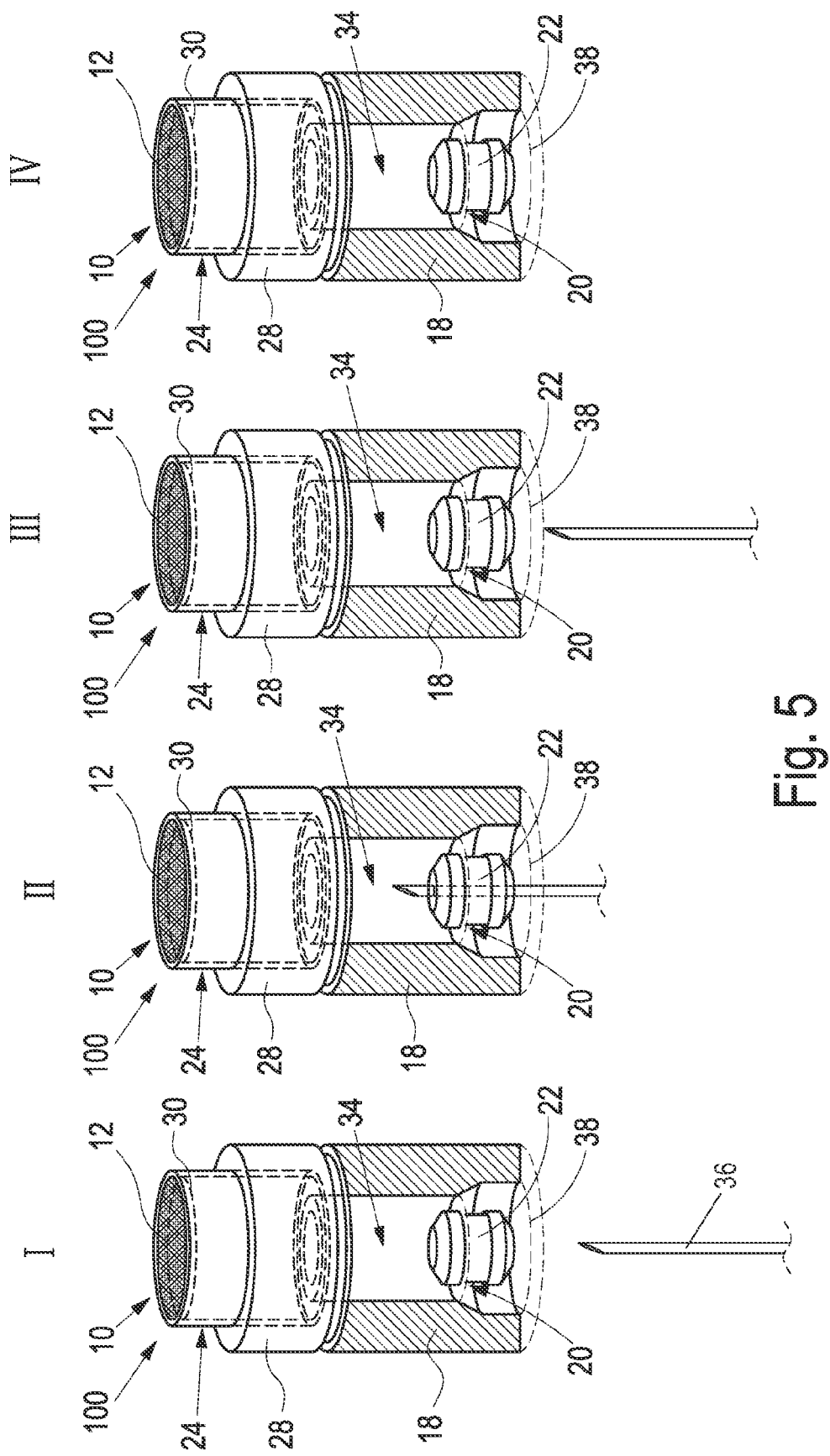
FIG. 5 shows a figural representation of an embodiment of the method for manufacturing microstructures according to the invention, including the method for filling a permeable template, on the basis of the handling unit of FIG. 3.

FIG. 5 shows an example of the method for manufacturing microstructures according to the invention, wherein the method for filling a permeable template according to the invention forms part of said method. The method is shown on the basis of the device 10 for manufacturing microstructures according to the embodiment of FIG. 3 and with exemplary method states I-IV.

In the first state I a formulation, in particular a casting formulation for manufacturing a microneedle array, for example, is fed to the template 12. The hydrophobic characteristics of the template 12 in particular made from silicone can lead to air inclusions between the formulation and the template 12, in particular between the formulation and the recesses 14 in the template 12. In state I a vacuum does not yet exist in the vacuum chamber 18 but preferably the ambient pressure prevails therein.

II shows the piercing of the elastic plug 22 by means of a hollow needle 36. Accordingly, a connection from the interior 34 of the vacuum chamber to the surroundings is created. For instance, via a vacuum pump not illustrated which is connected to the hollow needle 36 a negative pressure can now be generated in the interior 34 of the vacuum chamber. In other words, in step II the vacuum pump is coupled and in particular a vacuum is generated.

III shows the removal of the hollow needle 36 from the plug 22 and thus from the interior 34 of the vacuum chamber. After the removal of the hollow needle 36 the elastic plug 22 closes itself such that the vacuum chamber 18 is closed towards the surroundings. Thereby, it is possible that a vacuum generated in the vacuum chamber 18 is maintained by the vacuum chamber 18 itself. In other words, in step III the vacuum pump is uncoupled.

State IV shows an example of maintaining the vacuum by the vacuum chamber itself. It is preferred that this vacuum is maintained for at least 15 minutes by the vacuum chamber 18 itself.

The vacuum in the interior 34 of the vacuum chamber ensures that gases are taken in through the permeable template 12. Here, in particular air inclusions between the template 12 and the formulation fed to the latter are taken into the interior 34 of the vacuum chamber through the template 12. Thus the master mold of the template 12 is preferably completely filled with the formulation in particular without any air inclusions therebetween. Consequently, it is possible to minimize defects, in particular structure defects, of a microneedle array to be manufactured and to manufacture a defect-free microneedle array.

Although feeding of the formulation in the first state I has been described as an example, it is possible that the formulation is fed after and/or during the generation of the vacuum in the interior 34 of the vacuum chamber. Accordingly, the method steps described here and shown in FIG. 5 can also be applied to other embodiments, in particular the embodiments of FIGS. 1 and 2.

The invention claimed is:

1. A device for manufacturing microstructures comprising:
   at least one permeable gas-transmissible template;
   a vacuum chamber connected to the at least one permeable gas-transmissible template, wherein the vacuum chamber is configured such that the vacuum chamber at least temporarily maintains by itself an externally generated vacuum, and wherein the vacuum chamber comprises at least one vacuum chamber opening for connecting to a pump for generating a vacuum in the vacuum chamber; and
   at least one self-closing valve for closing the at least one vacuum chamber opening such that an existing pressure ratio inside the vacuum chamber is maintained,
   wherein the at least one permeable gas-transmissible template comprises at least one conical recess for manufacturing the microstructures,
   wherein the pump is connected to the at least one permeable gas-transmissible template and the vacuum chamber such that the combination of the pump and the vacuum chamber generates the vacuum, and
   wherein the vacuum is applied to at least one side of the at least one permeable gas-transmissible template.

2. The device according to claim 1, further comprising a coupling device for selectively coupling the vacuum chamber to the at least one permeable gas-transmissible template.

3. The device according to claim 1, wherein the valve is an elastic closure.

4. The device according to claim 3, further comprising a mold connected to the at least one permeable gas-transmissible template, wherein the mold comprises a flange for connecting to the vacuum chamber.

5. The device according to claim 3, further comprising a connecting element for providing a screwed connection between a mold and the vacuum chamber, wherein the mold is connected to the at least one permeable gas-transmissible template.

6. The device according to claim 3, wherein the closure is self-sealing after having been pierced.

7. The device according to claim 1, further comprising a mold integrally formed with the at least one permeable gas-transmissible template.

8. The device according to claim 1, further comprising a mold connected to the at least one permeable gas-transmissible template, wherein the at least one permeable gas-transmissible template and/or the mold comprises a plastic material.

9. The device according to claim 1, wherein the vacuum chamber comprises a flange and/or a thread.

10. The device according to claim 9, wherein a connecting element comprises a cap nut which is adapted to be placed over a mold such that the mold is screw-connected to the vacuum chamber, wherein the mold is connected to the at least one permeable gas-transmissible template.

11. The device according to claim 1, further comprising a gas-transmissible support element adapted to planarly abut on the at least one permeable gas-transmissible template for supporting the at least one permeable gas-transmissible template.

12. The device according to claim 1, wherein the vacuum is applied to at least one opposite side of at least one conical recess of the at least one permeable gas-transmissible template.

13. The device according to claim 1, further comprising a coupling device for selectively coupling the vacuum chamber to the at least one permeable gas-transmissible template via the vacuum chamber opening.

14. A handling unit for manufacturing microstructures comprising a device for manufacturing microstructures according to claim 1, wherein the handling unit serves as a carrier element for the microstructure to be manufactured during the entire manufacturing process.

15. A method for filling a permeable gas-transmissible template according to claim 1, wherein the permeable gas-transmissible template includes at least one recess for manufacturing microstructures, the method comprising the steps of:
   feeding at least one liquid substance to be filled in to the permeable gas-transmissible template; and generating a vacuum on at least one side of the permeable gas-transmissible template in at least opposite the at least one recess of the template, wherein the step of generating the vacuum is performed before, after and/or during the step of feeding the substance to the template.

16. The method according to claim 15, further comprising:

evacuating a vacuum chamber connected to the permeable gas-transmissible template via a connection to the interior of the vacuum chamber for generating the vacuum.

17. The method according to claim 16, further comprising selectively coupling a vacuum-generating device to the permeable gas-transmissible template for generating the vacuum.

18. The method according to claim 16, further comprising penetrating an elastic valve of the vacuum chamber for creating the connection to the interior of the vacuum chamber.

19. The method according to claim 15, further comprising filling the vacuum chamber via a connection to an interior of the vacuum chamber for generating an atmospheric pressure or a positive pressure.

* * * * *